2,768,689

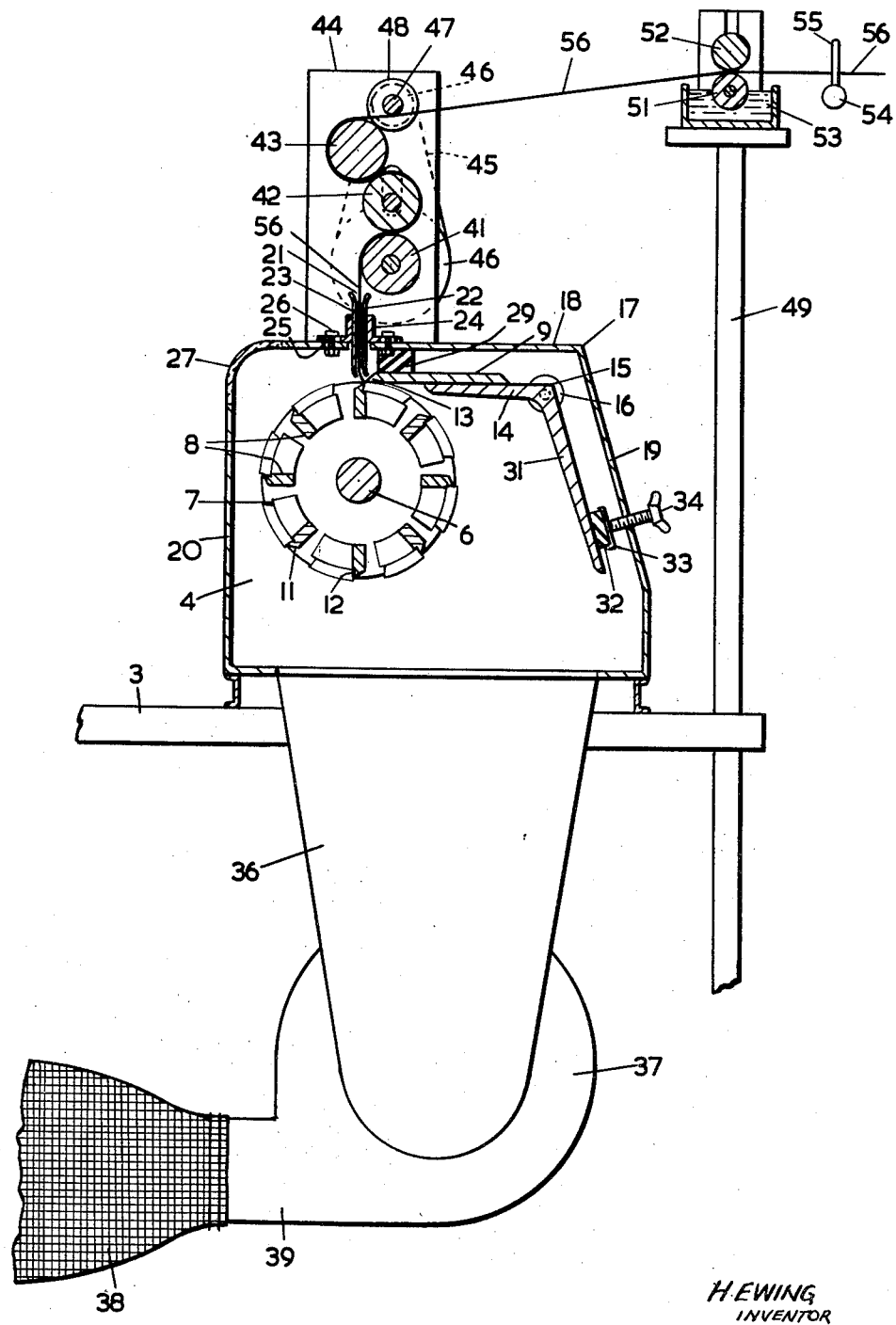

United States Patent Office

Patented Oct. 30, 1956

2,768,689

FIBER CUTTING APPARATUS COMPRISING A STATOR BLADE URGED AGAINST A ROTOR BLADE BY DAMPED RESILIENT MEANS

Henry Ewing, Spondon, near Derby, England, assignor to British Celanese Limited, a corporation of Great Britain Application October 27, 1952, Serial No. 316,957

Claims priority, application Great Britain November 22, 1951

7 Claims. (Cl. 164—68)

This invention relates to cutting devices, being particularly concerned with devices for the cutting of fibres, especially continuous filaments, into short lengths and especially into very short lengths suitable for use as fibrous flock.

According to the present invention a fibre-cutting device comprises a stator blade, a rotor having a plurality of blades whose edges lie on a surface of revolution containing the edge of said stator blade and are adapted to co-operate with and at an angle to said stator blade in a cutting action, and resilient means for urging said stator blade against the blades of said rotor. The device is thus of the lawn-mower type, the stator blade being preferably a straight blade lying parallel to the axis of the rotor, as is usual with cutters of this type, so that the edges of the rotor blades lie on the surface of a cylinder. The stator blade, however, instead of being rigidly mounted at a slight clearance from the surface swept by the rotor blades, is resiliently urged against the rotor blades so that the co-operation between the stator and rotor blades is consistently one of actual contact. This arrangement enables even very fine fibres to be cut with certainty and uniformity into very short lengths, e. g. of the order of 1–2 mm. or less, and also renders the stator and rotor blades self-sharpening so that cutting can continue for very long periods without interruption.

It is desirable, in order to maintain consistent contact between the stator and rotor blades, that the freedom of movement implicit in the resilient urging of the stator blade should be damped so as to reduce vibration resulting in "bounce" between the stator and the rotor blades. This can conveniently be done by providing resilient elements in the form of blocks of rubber or like resilient material the straining of which, consequent upon movement of the stator blade, is self-damping. The mounting of the stator blade can be such that it is resiliently urged by such blocks in both directions, but more strongly towards than away from the rotor blades, the resultant urging effect depending on the difference between the forces applied while the damping effect depends upon the sum of those forces. It is also desirable that, while the stator blade is resiliently urged towards the rotor blades, and preferably directly towards the axis of rotation thereof, its mounting should be rigid in a direction at right-angles to that in which it is urged so as to prevent any motion of the fixed blade in or against the direction of rotation of the rotor blades.

In order to take full advantage of the certainty of action of the device, the blades should be carefully formed. The outer edges of the rotor blades are preferably backed off, e. g. at an angle of about 30°, from the surface of the cylinder generated by the rotation of the blades, so as to minimise the area of the blades which actually comes into contact with the stator blade and is subjected to the self-sharpening action by which the blades are kept keen. The leading face of each rotor blade should be slightly undercut, e. g. to an angle of about 80° to the surface of the cylinder. The stator blade itself is preferably ground, on the face engaged by the rotor blades, to the radius of the rotor blades and is then set back in the plane of said face so as to engage the rotor blades only at the edge of the ground-off area.

In order to minimize wear of the blades, the cutting action should be distributed over substantially the whole length of the stator and rotor blades, along the axis of rotation of the rotor. This can best be done by feeding the fibres in the form of a broad thin sheet rather than in the form of a bundle that is traversed to-and-fro along the length of the blades. In this way disturbance of the length of the cut fibre by the traversing action is avoided, and at the same time the blades are called upon to cut only a thin sheet of fibres instead of having to cut through a relatively thick bundle. Feeding in this manner can be effected by means of a set of feed rollers supplying the sheet of fibres radially inwards past the edge of the stator blade.

In order to maintain tension on the fibres right up to the point where they are cut, suction can be employed to draw them past the stator blade, the suction also serving to draw away the cut fibres into a collecting bag or other suitable container. In order to concentrate the effect of suction, the rotor may be contained in a casing, having a narrow entry slot of which one edge is constituted by the stator blade, and having an exhaust through which air and the cut fibres are drawn away. The cutting action can be assisted by wetting the fibres before they reach the cutting blades, and a wetting roller may be associated with the feed rollers for this purpose.

The invention is applicable to the cutting of fibres of any suitable kind which are supplied in a form capable of being fed continuously to the blades, e. g. as a yarn or sliver or (and preferably, as already indicated) as a web or sheet. It is particularly advantageous, however, for the cutting of continuous artificial filaments, e. g. filaments of cellulose acetate, supplied as a sheet or warp of continuous filament yarns, preferably of low twist. The yarn can be drawn from individual packages carried on a suitable creel, and guided into the form of a warp or sheet, or they can be drawn from a drum or beam-section on which they have been previously wound in warp form. While the invention is especially applicable to cutting fibres into very short lengths for the production of flock, it may also be applied to the production of greater lengths, e. g. for the cutting of continuous artificial filaments into staple fibres for subsequent spinning into staple fibre yarns.

By way of example, one form of apparatus for the cutting of continuous filaments into flock, and an example of the manner of its use, will now be described in greater detail, with reference to the accompanying drawing, which is a diagrammatic sectional side elevation of the apparatus.

The device is mounted on a table 3 and comprises two side frames 4 each carrying a bearing for the rotor of the device, which is in the form of a central spindle 6 having end spiders 7 for supporting the rotor blades 8. The rotor blades are eight in number and 7" in axial length, each consisting of a strip twisted in the form of a helix and covering 60° of angle about the central spindle 6, so that the blades overlap in their engagement with the stator blade 9. Their outer edges are bevelled at 11 to an angle of about 30° to the tangent plane of the cylinder of revolution generated by them in their rotation, but in the use of the device the sharp angle thus formed, adjoining the leading face of the blade, is worn off to a narrow land forming part of that cylinder. The leading face of the blade is undercut at 12 for a short distance radially inwards from the edge, to an angle of about 80° to the tangent plane.

Above the rotating element is mounted the stator blade of the device, in the form of a flat strip 9 of 7" length, lying in a horizontal plane with its forward edge 13 just behind the vertical plane through the axis of the rotor spindle 6. The rear edge of the stator blade 9 overlaps, and is adjustably secured to, one limb 14 of an angle-iron 15 which is pivoted in bushes 16 in the side frames 4 of the device. Both the stator blade 9 and the rotor 6, 7, 8 are enclosed within a casing 17 of which the side walls are the side frames 4 and which is provided with a top wall 18, rear wall 19 and front wall 20. Passing through the top wall is a slot 21 formed between two generally vertical but shaped plates 22, 23 mounted on angle-irons 24. The angle-irons 24 are slotted at 25 and secured by screws 26, the slots permitting the spacing between the plates 22, 23 to be adjusted. The front wall 20 includes a window 27 which enables the interior of the casing to be observed.

Between the top of the stator blade 9 and the underside of the top of the casing 17 is compressed a strip or pair of blocks 29 of soft rubber of such thickness as to force the underside of the fixed blade 9 into engagement with the moving blades 8. On the edge of the other limb 31 of the angle-iron 15 is a further block of rubber 32 covered by a plate 33 which is engaged by a screw 34 passing through the rear wall 19 of the casing 17. By tightening the screw 34 the blocks of rubber 29, 32 are compressed, the strip or blocks 29 remaining more strongly compressed than the block of rubber 32 so that the lower face of the stator blade 9 is maintained in light contact with the rotor blades 8. The forward edge 13 of the stator blade 9 is tipped with cobalt carbide, and its underside is ground to the radius swept out by the rotor blades 8 with the edge directly over the axis of rotation thereof. The stator blade 9 is then adjusted slightly rearwards on the limb 14 by about 0.01" so that only the forward zone of the ground portion engages the rotor blade 8. The upper side of the front edge 13 is bevelled to an angle of 30° to the horizontal, and the guide plate 22 reaches vertically downwards due to the bevelled surface, the lower edges of the guide plates 22, 23 being bent to an angle of about 60° to conform to the bevel of the blade 9.

Below the casing 17 is a conduit 36 leading to an air fan 37 adapted to deliver air drawn through the slot 21 and through the casing 17 into a loosely woven fabric bag 38 secured to the delivery conduit 39 of the fan 37.

Above the casing 17 are mounted the feed rollers 41, 42, 43 of the apparatus. The lowest roller 41 is carried in fixed bearings in extensions 44 of the side plates 4, and is driven by a chain 45 and sprockets 46 from a top shaft 47 also journalled in the extension 44 and connected by suitable gears (not shown) to the rotor spindle 6. The second roller 42 is mounted in vertical slots in the extensions 44 so as to rest on the roller 41. The top feed roller 43 is not mounted in bearings but is supported by the tension in the yarns as described hereafter. The top shaft 47 carries a pair of ball-races 48 spaced 7" apart, against which, and against the second roller 42, the upper roller 43 is drawn.

Behind and above the feed rollers 41, 42, 43, and mounted on a pair of pillars 49 on the table 3 carrying the device, are a pair of nip rollers 51, 52 and a water trough 53 into which the lower nip roller 51 dips. The lower roller 51 is fabric-covered, and the upper roller 52 rests upon it with its own weight. Behind the trough 53 is mounted a reed or comb 54 having teeth 55 spaced at about 6 to the inch. A sheet of yarns 56 can thus be passed through the comb 54, between the nip rollers 51, 52, forward over the top feed roller 43, back again through the nip between the top and middle feed rollers 43, 42, forward again through the nip between the middle and the bottom feed rollers 42, 41, and thence downwards through the slot 21 into the casing 17. The sheet of yarns 56 is supplied under tension so that the top roller 43 is pulled hard against the ball-races 48 and the middle roller 42 and is thereby located, and the three feed rollers 41, 42, 43 are pressed against one another so as to nip the sheet of yarns 56 and feed it forward. The yarns 56 pass below, and are guided by the top shaft 47 which rotates counter to the yarns and helps to tension the yarns evenly.

In the use of the device as described above, 420 ends of continuous filament cellulose acetate yarn, each of 650 denier, are drawn from a creel containing that number of braked bobbins and are led through the reed in groups of 12 ends per dent to form a sheet of yarns 56, 6" wide. The sheet passes between the nip rollers 51, 52 over the water trough 53, so as to be wetted by the water carried by the fabric-covered lower nip roller 51. The sheet then passes round the three feed rollers 41, 42, 43, by which it is drawn forward and fed downwards through the slot 21 in front of the fixed blade 9. The rotor of the device is driven at a speed of 500 R. P. M., the bottom feed roller 41 being geared to the rotor so as to rotate with a peripheral speed of about 2.8 metres/minute. The sheet of yarns 56 is drawn into the slot 21 by the suction of the fan 37, and is cut into lengths of the order of 0.7 mm. by the moving blades 8, the cut fibres being drawn away through the fan 37 and delivered into the bag 38 in which they are retained. The porosity and size of the bag 38 is sufficient to prevent the development of undue back-pressure which would impair the working of the fan 37, and the degree of suction developed at the slot 21 is of the order of 2" of water. The width of the slot 21 is adjustable, as mentioned above, and can be varied to suit the character of the yarns 56. Too wide a spacing gives rise to fluttering of the sheet, as can be observed through the window 27. Too narrow a slot tends to check the suction and give rise to erratic running. The width of the slot should be of the order of 3/16". After cutting, the flock is washed and thoroughly dried.

During the running of the device the stator and rotor blades are maintained in light engagement with one another so that they exert a continual slight burnishing action, rendering them self-sharpening. The degree of pressure between them can be adjusted from time to time as wear takes place, by means of the screw 34 acting on the rear limb 31 of the angle-iron 15 carrying the stator blade 9. The provision of rubber blocks 29, 32 as the resilient means for urging the stator blade 9 against the rotor blades 8 gives a damping effect, preventing vibration and "bounce" of the stator blade 9 against the rotor blades 8, which might impair the certainty of cutting. Thus the rubber blocks constitute damped resilient means connected to the stator blade for resiliently urging said stator blade against the blades of the rotor and for checking the motion of the stator blade towards and away from the axis of the rotor.

Having described my invention, what I desire to secure by Letters Patent is:

1. Apparatus for cutting fibres, said apparatus comprising a rotor having a plurality of blades whose edges lie on a common surface of revolution about the axis of said rotor, a stator blade movable towards and away from said axis and having an edge lying substantially on said surface of revolution, said stator blade being at an angle to the blades of said rotor and always in engagement with at least one of said blades so as to cooperate therewith in a cutting action, and damped resilient means connected to said stator blade for resiliently urging said stator blade against the blades of said rotor and for checking the motion of said stator blade towards and away from said axis.

2. Apparatus for cutting fibres, said apparatus comprising a rotor having a plurality of blades whose edges lie on a common surface of revolution about the axis of said rotor, a stator blade movable towards and away from said axis and having an edge lying substantially on said surface of revolution, said stator blade being at an angle to the blades of said rotor and always in engagement with at least one of said blades so as to cooperate therewith in a cutting action, and damped resilient means connected to said stator blade for resiliently urging said stator blade against the blades of said rotor and for checking the motion of said stator blade towards and away from said axis, said resilient means including resilient elements of a soft rubber-like material.

3. Apparatus for cutting fibres, said apparatus comprising a rotor having a plurality of blades whose edges lie on a common surface of revolution about the axis of said rotor, a stator blade movable towards and away from said axis and having an edge lying substantially on said surface of revolution, said stator blade being at an angle to the blades of said rotor so as to cooperate therewith in a cutting action, resilient means for urging said stator blade away from the blades of said rotor and stronger resilient means for urging said stator blade against the blades of said rotor, each of said urging means including a resilient element of a soft rubber-like material whereby motion of said stator blades towards and away from said axis is damped.

4. Apparatus for cutting fibres, said apparatus comprising a rotor having a plurality of blades whose edges lie on a common surface of revolution about the axis of said rotor, a stator blade movable towards and away from said axis and having an edge lying substantially on said surface of revolution, said stator blade being at an angle to the blades of said rotor and always in engagement with at least one of said blades so as to cooperate therewith in a cutting action, damped resilient means connected to said stator blade for resiliently urging said stator blade against the blades of said rotor and for checking the motion of said stator blade towards and away from said axis, and means for feeding fibres to said blades in the form of a thin sheet of a breadth substantially corresponding to the length of said stator blade.

5. Apparatus for cutting fibres, said apparatus comprising a rotor having a plurality of blades whose edges lie on a common surface of revolution about the axis of said rotor, a stator blade movable towards and away from said axis and having an edge lying substantially on said surface of revolution, said stator blade being at an angle to the blades of said rotor and always in engagement with at least one of said blades so as to cooperate therewith in a cutting action, damped resilient means connected to said stator blade for resiliently urging said stator blade against the blades of said rotor and for checking the motion of said stator blade towards and away from said axis, a casing enclosing said rotor and having a restricted entry passage for fibres adjacent to said rotor blade, and means for applying suction to the interior of said casing.

6. Apparatus for cutting fibres, said apparatus comprising a rotor having a plurality of blades whose edges lie on a common surface of revolution about the axis of said rotor, a stator blade movable towards and away from said axis and having an edge lying substantially on said surface of revolution, said stator blade being at an angle to the blades of said rotor and always in engagement with at least one of said blades so as to cooperate therewith in a cutting action, damped resilient means connected to said stator blade for resiliently urging said stator blade against the blades of said rotor and for checking the motion of said stator blade towards and away from said axis, means for feeding fibres to said blades, and means for wetting said fibres before they reach said blades.

7. Apparatus for cutting fibres, said apparatus comprising a rotor having a plurality of helical blades whose edges lie on a cylinder of revolution about the axis of said rotor, a straight stator blade movable towards and away from said axis and having an edge lying on said cylinder adapted to cooperate with the blades of said rotor in a cutting action, a casing enclosing said rotor and having a restricted entry slot for fibres adjacent to and extending along said stator blade, means for applying suction to the interior of said casing, means for feeding fibres through said slot in the form of a broad thin sheet, means for wetting said sheet before it enters said slot, resilient means for urging said stator blade away from the blades of said rotor, and stronger resilient means for urging said stator blade against the blades of said rotor, each of said urging means including a resilient element of a soft rubber-like material whereby motion of said stator blade towards and away from said axis is damped.

References Cited in the file of this patent

UNITED STATES PATENTS

| Number | Name | Date |
|---|---|---|
| 359,846 | Coburn | Mar. 22, 1887 |
| 583,141 | Dillon | May 25, 1897 |
| 1,090,388 | Foote | Mar. 17, 1914 |
| 1,098,512 | Krauth | June 2, 1914 |
| 1,296,554 | Redington et al. | Mar. 4, 1919 |
| 1,302,398 | Mangini | Apr. 29, 1919 |
| 1,799,067 | Schleth | Mar. 31, 1931 |
| 2,010,078 | Hale | Aug. 6, 1935 |
| 2,064,989 | Ritzerfeld | Dec. 22, 1936 |
| 2,581,467 | Bailiff et al. | Jan. 8, 1952 |
| 2,631,668 | Wicker | Mar. 17, 1953 |